(12) United States Patent
Schweickart et al.

(10) Patent No.: US 6,252,883 B1
(45) Date of Patent: Jun. 26, 2001

(54) HOME AND PERSONAL DATA SERVICES OVERLAY COMMUNICATIONS SYSTEM

(75) Inventors: Russell L. Schweickart, Tiburon; Norman Abramson, San Francisco, both of CA (US)

(73) Assignee: ALOHA Networks, Inc., San Francisco, CA (US)

( * ) Notice: Subject to any disclaimer, the term of this patent is extended or adjusted under 35 U.S.C. 154(b) by 0 days.

(21) Appl. No.: 09/031,664

(22) Filed: Feb. 27, 1998

Related U.S. Application Data

(60) Provisional application No. 60/039,393, filed on Feb. 27, 1997.

(51) Int. Cl.[7] .................................................. H04B 7/216
(52) U.S. Cl. ........................ 370/441; 370/342; 455/414; 455/420; 455/422
(58) Field of Search .................................... 370/342, 343, 370/344, 345, 346, 347, 401; 455/414, 420, 422; 340/825.06, 825.69

(56) References Cited

U.S. PATENT DOCUMENTS

| | | |
|---|---|---|
| 5,327,478 | 7/1994 | Lebowitz . |
| 5,343,493 | 8/1994 | Karimullah . |
| 5,390,238 | 2/1995 | Kirk et al. . |
| 5,537,397 | 7/1996 | Abramson . |
| 5,568,535 | 10/1996 | Sheffer et al. . |
| 5,675,371 * | 10/1997 | Barriger ............................ 455/420 |
| 5,745,485 * | 4/1998 | Abramson ........................ 370/342 |
| 5,758,281 * | 5/1998 | Emery ............................... 455/428 |
| 5,761,083 * | 6/1998 | Brown .......................... 340/825.06 |
| 5,923,269 * | 7/1999 | Shuey ............................ 340/870.02 |
| 6,049,711 * | 4/2000 | Ben-Yehezkel .................. 455/414 |

* cited by examiner

*Primary Examiner*—Douglas Olms
*Assistant Examiner*—Ricardo M. Pizarro
(74) *Attorney, Agent, or Firm*—James Creighton Wray; Meera P. Narasimhan

(57) ABSTRACT

The invention provides both a fixed and a mobile data telecommunication service using a fixed code, direct sequence spread spectrum, connection-free data protocol as an overlay on cellular or PCS wireless services. A wide band connectionless data protocol is employed to transmit packetized digital data from a variety of home sources e.g. www inputs, e-mail, utility meter readings, security system data, to a local cellular or PCS communications hub station. From the hub station the cellular/PCS provider routes the packet data into packet networks for delivery to a variety of recipient parties designated by address within the packets themselves. The data capability is provided as a supplement to the existing communications capability of the cellular/PCS system and overlays, but does not destructively interfere with, the pre-existing voice connection oriented services.

43 Claims, 3 Drawing Sheets

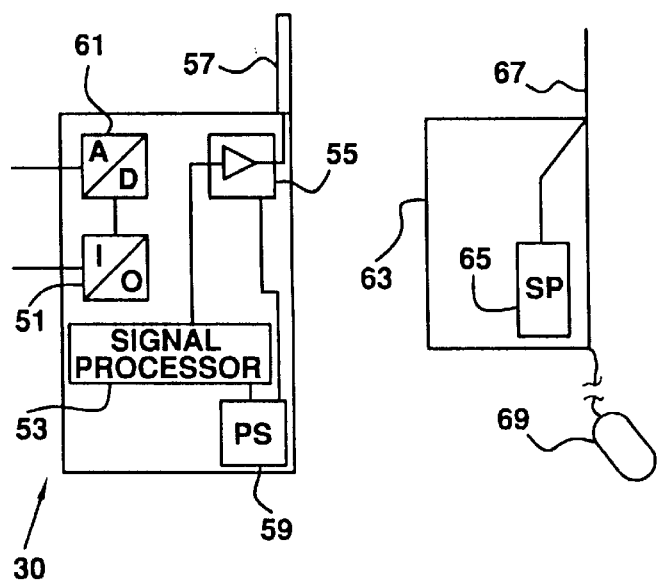
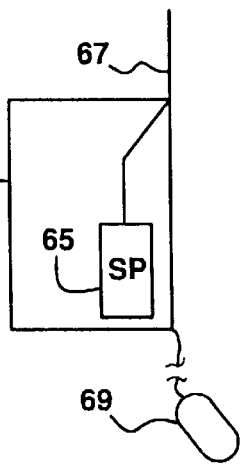
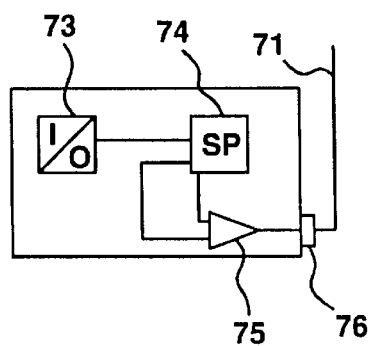
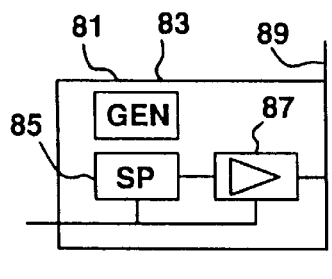
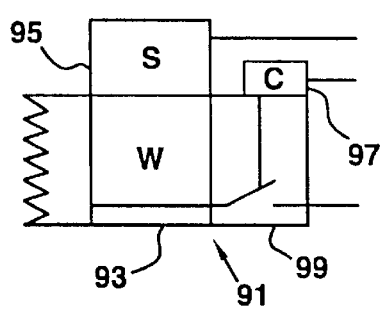
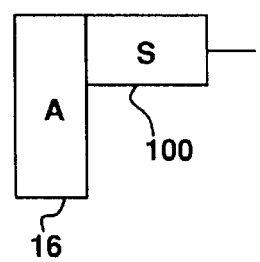
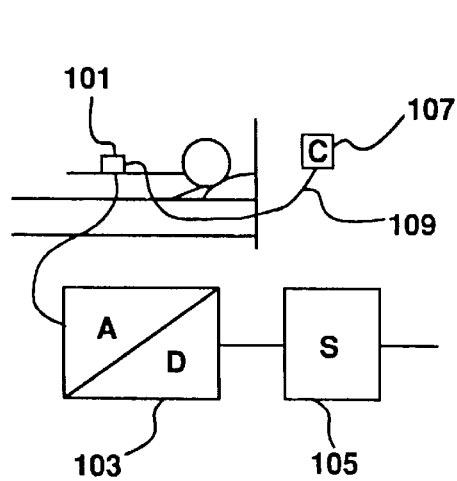
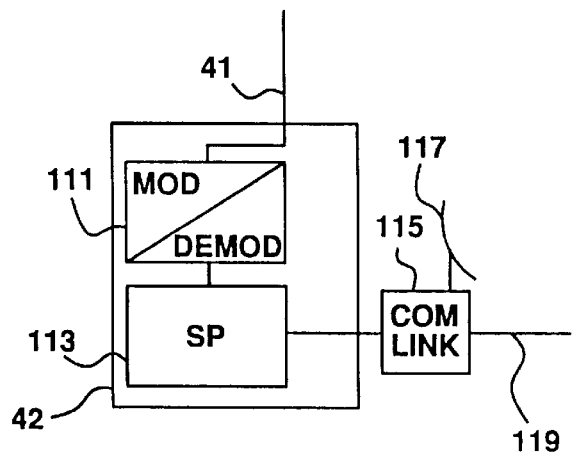

HOME AND PERSONAL DATA SERVICES OVERLAY COMMUNICATIONS SYSTEM

This application claims the benefit of U.S. Provisional Application No. 60/039,393, filed Feb. 27, 1997.

BACKGROUND OF THE INVENTION

Prior art, Spread ALOHA CDMA Data Communications, U.S. Pat. No. 5,537,397, has resolved the problems associated with providing multiple access to a data communications channel without prearranging times or querying availability, and with automatic offsetting of the identical form signals.

This invention now provides a fixed and mobile data telecommunication service using a fixed code (or several fixed codes), direct sequence spread spectrum, connection free data protocol as an overlay on cellular or PCS wireless services.

SUMMARY OF THE INVENTION

The invention provides both a fixed data telecommunication service, Home Data Service (HDS), and a mobile data telecommunication service, Personal Data Service (PDS), using a fixed code (or several fixed codes), direct sequence spread spectrum, connection free data protocol as an overlay on cellular or PCS wireless services.

The new overlay is designed for providing cost effective broad band fixed and mobile data services by overlaying a Spread Aloha Multiple Access (SAMA) network on existing cellular or PCS systems. It provides two-way data communication to customer premises for AMR and other services and utilizes existing cellular/PCS installations. In the home, interface to applications can be wired (including powerline signals), wireless or a mix.

In the Home Data Service, a wide band connectionless data protocol (>100 Kbps peak aggregate data rate at the hub) is employed to transmit packetized digital data from a variety of home sources (e.g. www inputs, e-mail, utility meter readings, security system data, in-home medical data, response and/or control data for cable or direct TV (direct broadcast satellite TV), and other "upstream" data signals through a building-mounted transmitter to a local cellular or PCS communications hub station. From the hub station the cellular/PCS provider routes the packet data into packet networks for delivery to a variety of recipient parties designated by address within the packets themselves.

The HDS provider supplies the building hardware and software required to gather and transmit the data to the cellular/PCS hub as well as the add-on hardware and software needed at the hub to receive and decode the data from the hundreds or thousands of buildings within the cell boundaries. The system is capable of both one- and two-way communications.

The data capability is provided as a supplement to the existing communications capability of the cellular/PCS system and overlays, but does not destructively interfere with, the preexisting voice (and/or other) connection oriented services.

Two options are used for the radio design. The HDS shares the spectrum allocated to the cellular or PCS system, or it is implemented using an entirely separate licensed or unlicensed frequency. In the former case, much of the radio system of the cellular or PCS hub station may be shared with the HDS (e.g., antenna, transmitter, receiver, amplifiers, etc.). In the latter instance, most of these systems are separately provided as part of the HDS.

In the Personal Data Service, the data service is delivered directly to individuals through mobile and/or portable devices which may either be moving (as in the case of the normal cellular or PCS subscriber) or be moveable from place to place. All other elements of the above description for the HDS implementation apply, other than the typical applications.

In this configuration, the PDS either is integrated into the portable voice hand sets used in cellular and PCS today, or is implemented in stand alone devices such as wireless modems, two-way pagers and other wireless mobile data devices. Such implementations serve to provide mobile individuals with two-way paging, e-mail, Internet access (including www), medical monitoring, and other services. Additionally, the PDS is utilized for efficient data communications for package or asset tracking, vehicle tracking, and other commercial or industrial mobile data services.

The preferred invention is focussed on overlaying Spread ALOHA data communications with broad band, connectionless data transmission on top of existing connection oriented cellular or PCS systems or on dedicated cellular-like structures, rather than using and therefore displacing their existing connection oriented services. Power, alarm and in-home health monitoring are some of many sources of data within the home. The invention is focussed on the digital telecommunication system between the home and the pre-existing and modified cell hub. The invention in the form of the Personal Data System provides the overlay data service for mobile users.

The Spread ALOHA system described in U.S. Pat. No. 5,537,397 preferably is used to separate the data packets arriving substantially simultaneously at the hub from the HDS and PDS data devices.

These and further and other objects and features of the invention are apparent in the disclosure, which includes the above and ongoing written specification, with the claims and the drawings.

BRIEF DESCRIPTION OF THE DRAWINGS

FIG. 2 is a schematic representation of the data device which is a card with an antenna connection, a chip set for a mobile telephone or a stand-alone device.

FIG. 3 is a schematic detail of the cellular phone with a personal monitor.

FIG. 4 is a schematic detail of a PDS card for inserting in a portable computer.

FIG. 5 is a schematic detail of a chip set for installation in an automobile.

FIG. 6 is a schematic detail of a watt meter and sender and a controller and switch for use with electrically operated devices.

FIG. 7 is a schematic detail of an alarm system and sender.

FIG. 8 is a schematic detail of a patient monitoring system for an HDS system.

FIG. 9 is a schematic representation of a hub installation.

DETAILED DESCRIPTION OF THE PREFERRED EMBODIMENTS

Figure 1:
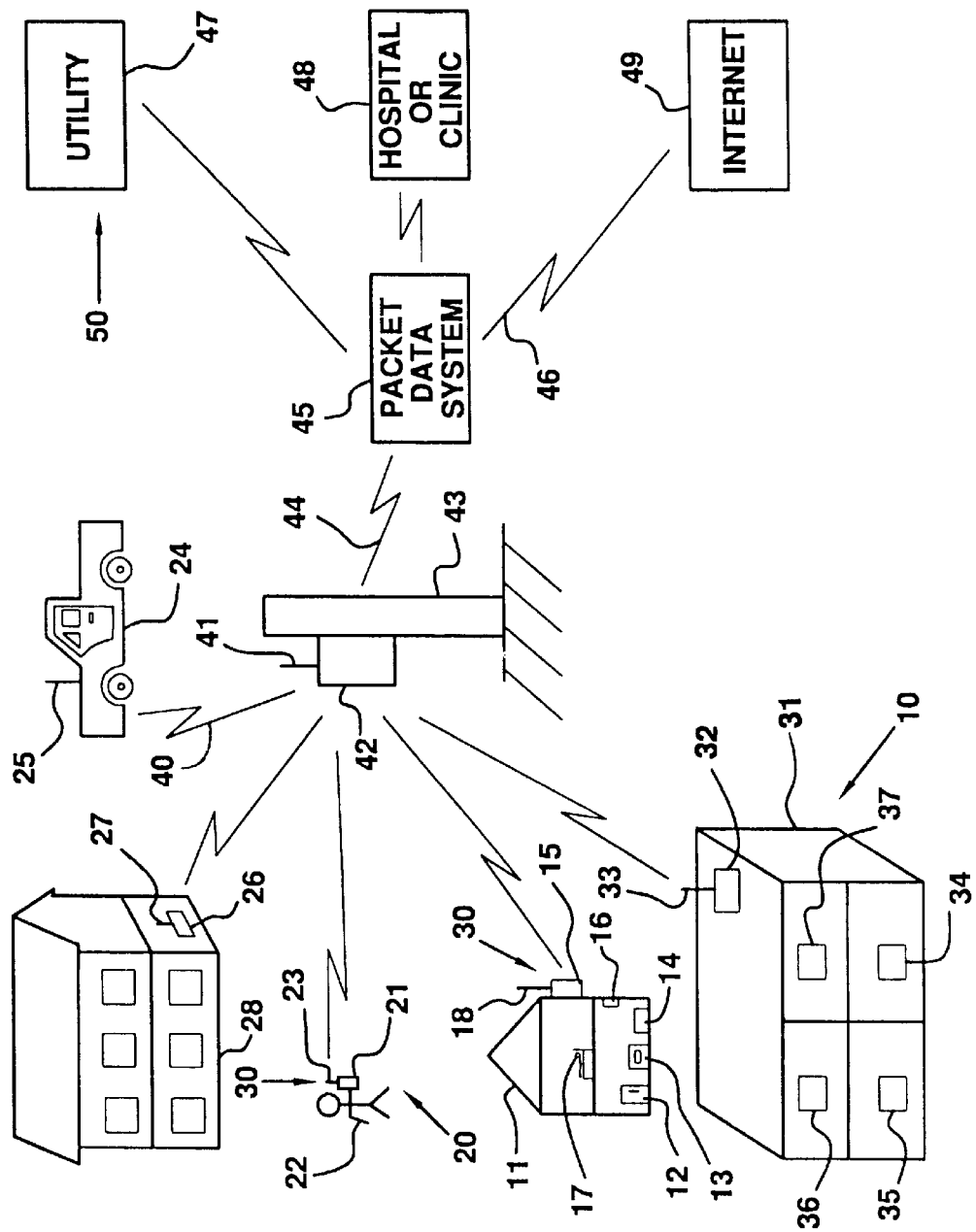
FIG. 1 is a schematic representation of the new overlay system showing the PDS and HDS systems used with the cellular, PCS or packet network hub and a packet data system.

FIG. 1 shows a data communication service 1 which may either be a fixed data communication service 10, also referred to as a Home Data Service or HDS or a mobile data communication service 20, also designated as a Personal Data Service or PDS. Each service uses data communication transmitters or transceivers 30, also called data devices. Within a home 11, several devices, for example a water heater 12, a television descrambler 13 and a freezer 14, may be connected to the home data device 15, which is shown schematically mounted on an outside of a wall of a home.

An alarm system 16 and a medical patient 17 may be connected to the home data device 15. an antenna 18 sends and receives signals. In the Personal Data System, the data device 30 may be a stand-alone hand carried device 21. The data device may be a chip set within a cellular or PCS telephone which is portable and hand carried by a person 22. Antenna 23 sends and receives signals in the mobile or PCS. Data device 30 may be permanently mounted in an automobile 24 as part of an onboard cellular or PCS telephone or as a stand-alone data device with no voice capability. The data device 30 may be a separate system of chips embedded in the automobile 24 to send and receive data packets via antenna 25. The data device may be a card in a computer 26 by which antenna 27 sends and receives data packets. The device is especially useful when working at a remote location, for example in motel 28. The data devices 30 provide connectionless data transmission.

As shown in FIG. 1, when an HDS fixed data transmission system 10 is used in a factory 31 or warehouse, the data device 32 may transmit and receive via antenna 33 data packets which are related to particular operations 34 and machines 35 within the factory. The data device 32 receives data inputs. The data device may be used to supply information to production machinery 36 and warehousing devices 37 for control of manufacture and inventory and for reporting.

All of the data devices 30 send addressed data packets using a wide band connectionless data protocol using identical spreading codes in transmissions 40. The data packet transmissions are received by antenna 41 of cellular, PCS or packet data network hubs 42, which are mounted on existing or specially erected vertical structures 43. The data packets are provided by communications 44 to a data packet system 45, which directs the data packets via communication links 46 to main users 50, such as utility 47 and hospital or clinic 48, or places the addressed data packets on internet 49.

Preferably each data device 30 has a modulator for converting the information which it transmits into Spread ALOHA Multiple Access (SAMA) data packets.

Each cellular site or hub 42 has a demodulator/modulator for converting the multiplexed SAMA data packets that it receives substantially concurrently from the multiple data devices 30 to addressed data packets, which are provided by microwave, satellite or wire or fiber optic communications 44 to a packet data system 45. The packet data system directs the addressed data packets to a number of different recipients 50, for example a utility 47 or hospital 48.

The communications 46 between the packet data system 45 and the number of different recipients 50 may be conducted by microwave, satellite communications or other wire or fiber optic communications.

The large users or recipients 50 and the internet 49 provide addressed data packets over the same communication links 46 to the data packet system 45, the communication links 44 and the modulator in the cell site hub 42. The cell site antenna 41 broadcasts the addressed data packets to the data devices 30. Each data device 30 adds its own address to the transmitted data packets it transmits and recognizes its own address in data packets broadcast from the hub.

In the Home Data System 10 used in a home 11, for example, the demodulated digitized information may be delivered to a patient 17 for changing instructions or intravenous drips altering the monitoring of the patient.

Demodulated information signals may be directed to water heater 12, a descrambler on television 13 or freezer 14 to start or stop the systems according to the broadcast signal, or to request a reading of the status of the system. Each data device 30 recognizes its own address and demodulates the signals intended for that data device. The electrical meter in the home may provide digital information to the data device 30 for near real time transmission of data packets having current power usage information.

The hub may broadcast data from the utility for turning on and off electric power uses such as water heaters, freezers, air conditioners and clothes dryers which are capable of using power during excesses and minimizing use during maximum consumption periods on power usage. The broadcast data can also provide displays of power costs compared with time of day so that power users may select times of usage.

The data packets sent to the data devices may include acknowledgement of data received by the SAMA demodulators at the hub 42, as well as downlink information for the devices in the home. Part of the downlink information to home 11, for example, might be to reset or query the security system 16. In the case of the factory 31, the data device 32 includes a modulator/demodulator for converting digitized information from the sources 34–37 into spread multiple access codes which are transmitted for reception by the cell, PCS or packet data site hub.

The spread multiple access data packets are then demodulated and passed to the end user 50. Acknowledgements are sent back by the modulator within the cell site or hub 42 over digital broadcast communication links 44 and 46 and are received by antenna 33. The data device 32 recognizes its address and demodulates the broadcast data packets to digital information which it provides to the locations 34–37, such as for altering process controls or starting, stopping or directing machinery.

In the Personal Data System 20 the data devices 30 such as hand-held units 21 which may be chip sets in cellular phones, for example, transmit personal medical data which is modulated in the data device 21 and transmitted by antenna 23 as the spread multiple access data packets. A demodulator/modulator in the site or hub 42 receives the data and broadcasts an acknowledgement, and at the same time may provide downlink information in the same data packet broadcast on antenna 41 and addressed to the data device 21.

A person working away from home in a motel 28, for example, stores information or composes correspondence in a computer 27 and sends that information via antenna 27 to a hub 42 for communicating with a data packet system or the Internet. Hub 42 broadcasts addressed downlink data packets acknowledging receipt of the data packets, and instructing, advancing or delaying the data packet transmission and providing messages from incoming faxes or e-mail to the computer 26.

As shown in FIG. 2, the data device 30 has an input-output device 51 which receives digital data from the varied sources throughout a home or a factory, or sources associated with the mobile PDS. The input-output device provides signals to the signal processor 53, which packetizes and modulates the digital information in the form required for Spread ALOHA Multiple Access (SAMA) signals, which are amplified by amplifier 55 and transmitted from antenna 57. The amplifier 55 and the signal processor are supplied with power from a power source 59.

Incoming signals are amplified and provided to the signal processor 53, which recognizes signals addressed to the particular data device 30 and delays or advances outgoing data packets according to the information in the inbound data packets. The signal processor also delivers signals through the input-output device 51 to the appropriate peripheral device.

An analog-digital converter 61 may be provided in the data device 30 to accept and send appropriate analog signals.

As shown in FIG. 3, a convention cellular phone 63 has an embedded signal processor chip 65 to provide continuous monitoring from wristband 69 by superimposing SAMA signals from antenna 67.

As shown in FIG. 4, a computer card 71 has an input and output chip 73 and a signal processor chip 74, with an amplifier 75 and an antenna fitting 76 to transmit SAMA signals over antenna 77. Inbound data packets broadcast by the cell are amplified and demodulated by the signal processor 74, and when addressed to the particular signal processor, are sent to the input-output device for storing in the computer memory or displaying on the computer screen.

As shown in FIG. 5, a mobile automobile data device 81 has a sequence generator 83, a signal processor 85 and an amplifier 87, which leads to an antenna 89. The antenna 89 repeatedly transmits SAMA data packets indicating the identification of the automobile, whenever the system is powered or under certain events when the automobile is started without an appropriate keying, or when the signal processor 85 recognized its address in data packets received on antenna 89 to start the transmitting of data packets with the vehicle identification.

As shown in FIG. 6, an HDS system such as a machine or processor, water heater or freezer has a package 91, which includes a digital watt meter 93, a sender 95, a controller 97 and a switch 99. The sender 95 sends digital data to the input-output device 51 of the data device 30 shown in FIG. 8, and the controller 97 receives control signals from the input-output device 51 to turn switch 99 on or off, as controlled by demodulated signals from the signal processor 53.

As shown in FIG. 7, an alarm system 16 has a sender 100 which sends signals to the input-output device 51 or analog signals to the analog digital converter 61.

FIG. 8 shows a patient monitor 101 which, if it provides analog signals, is connected to an analog digital converter 103 and a sender 105 for providing digital signals to the input-output device 51 of data device 30. The data device 30 sends repetitive signals on antenna 57, indicating the patient status. Inbound data packets may be addressed to an intravenous drip controller 107 from the input-output device 51 to control an IV drip 109 according to timing or patient monitoring.

FIG. 9 shows a hub 42 with a modulator/demodulator 111 and signal processor 113 connected to the antenna 41 for receiving data packets. The modulator/demodulator and the signal processor demodulate the incoming data packets and provide them to a communications link 115, where the signals are sent by microwave 117 or wire or fiber optic cables 119 to the packet data system and main users. Inbound signals from the communication link 115 are fed to the signal processor and the modulator/demodulator 111, which convert the incoming digital signals to data packets for broadcasting on antenna 41. The entire system shown in FIG. 9 is used as an overlay to the existing cell or PCS hub and does not materially interfere with the digital voice system communications.

The signal processor 113 in the hub additionally creates advance or retard signals addressed to individual data devices with the acknowledgement data to enhance signal separation of the SAMA data packets.

Figure 10:
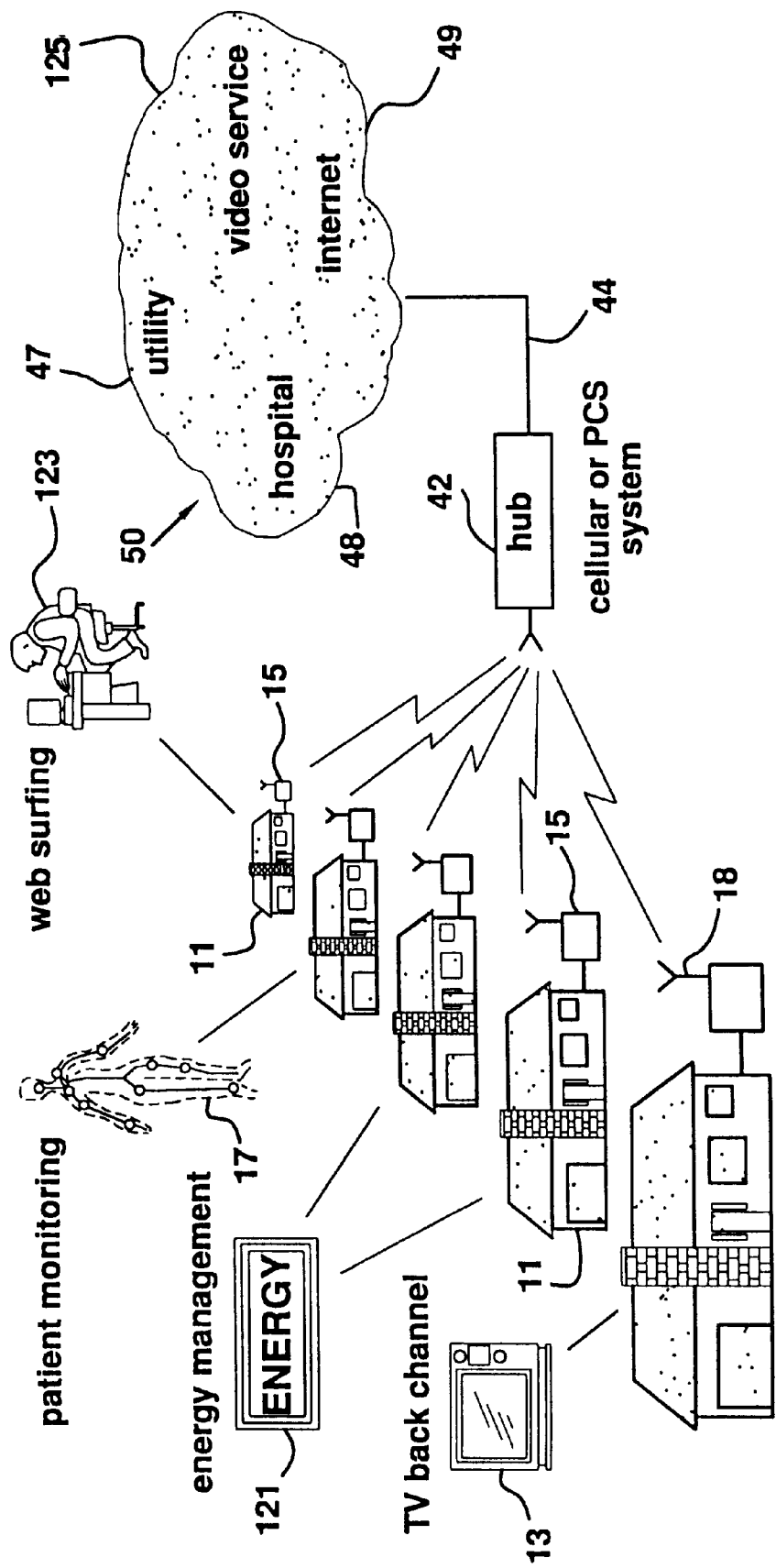
FIG. 10 is a schematic representation of HDS operation.

FIG. 10 shows an overlay schematic for an HDS. Patient monitoring 17, energy management 121, TV back channel 13 and web surfing 123 are provided by data packet transmissions from the transceivers 15 and broadcasts from hub 42 to and from large users 50, which include video service 125.

The invention provides Fixed Data Service, a new Home Data Service (HDS), and Mobile Data Telecommunication Service, a Personal Data Service (PDS). Data devices, in both systems, convert information inputs to direct sequence spread spectrum data packets and transmit the packets on shared frequencies using a connection free protocol such as SAMA. The data devices also receive spread spectrum data packets and send the packets to relevant systems or convert the incoming data packets to signals which are directed to the relevant systems. In preferred new PDS systems the data devices are integrated into laptop or hand held computers or are embedded in vehicles or containers. Alternatively, the data devices may be hand carried and plugged into computers, telephones or other systems.

The new fixed or Home Data Services is a wide band connectionless, multiple access data protocol system which transmits direct sequence spread spectrum data packets from a fixed home data device. The data device is composed of input/output signal processing, transceiver and antenna systems and can be connected to one or several home inputs. Examples of these inputs include, but are not limited to, a computer, one or more utility meters, a security system, an in-home patient monitoring system, and a television or other service control and/or response system.

The data device converts the multiple inputs and other computer-added information into spread spectrum data packets with distinct destination addresses. The transmitter transmits the data packets to a local commercial cellular, PCS or other data hub. The hub station directs the data packets to packet networks for delivery to recipients designated by addresses within the data packets. Similarly, the data device would receive signals from the hub and route the packets to the relevant system within the home or business. An example of such signals would be the electric utility sending commands to control energy-consuming appliances within the home or business.

The new Mobile or Personal Data Service performs directly analogous services to people and devices in mobile environments. The data device is embedded in laptop computers, cellular or PCS handsets and enables data packets to be transmitted and received as the person or vehicle moves with a cellular, PCS or other data network.

The data packets include, but are not limited to, e-mail, two-way paging, internet data, faxes, medical or other status monitoring data. The personal data services can also be used for efficient data communications for package, asset and vehicle tracking and other commercial-industrial mobile data communications.

The data packet transmissions from the Home Data Service or Personal Data Service are received by existing cellular, PCS or other data networks and operate as an overlay, which does not interfere with existing voice or other services.

Reception may be provided by stand-alone or dedicated networks with separate frequencies, antennae and hubs.

The systems are one-way or two-way data communication systems using a wideband connection free multiple access protocol such as SAMA from the home, business or mobile user to the hub station and a digital broadcast protocol from the hub station to the home, business or mobile unit. The home system, for example, may be used to control power-consuming equipment to facilitate cost effective energy conservation. The system provides near real-time power consumption data, allowing variable power billing according to utility costs.

While the invention has been described with reference to specific embodiments, modifications and variations of the invention may be constructed without departing from the scope of the invention, which is defined in the following claims.

We claim:

1. A two-way home and personal data services overlay telecommunication system comprising: a data communication service having at least one data device for transmitting and receiving data packets using a wide band connectionless data protocol and identical spreading codes, a network hub having an antenna for receiving multiplexed data packet transmissions from the at least one data device, the network hub further having a demodulator/modulator for converting the multiplexed data packets into addressed data packets, a data packet system for directing the addressed data packets to a main user or placing the addressed packets on Internet, a communication link between the network hub and the data packet system, and a plurality of communication links between the data packet system and main users, wherein the at least one data device has an address which is added to transmitted data packets and which is recognized by the data device when included in data packets broadcast from the network hub, and whereby recognition of the address prompts the data device to demodulate the broadcast data packets to digital information.

2. The system of claim 1, wherein the at least one data device comprises a data communication transceiver and an antenna.

3. The system of claim 2, wherein the at least one data device further comprises a modulator/demodulator for converting the information transmitted by the data device into multiple access data packets.

4. The system of claim 2, wherein the at least one data device further comprises an input-output device for receiving digital data, a signal processor for receiving signals from the input-output device and for packetizing and modulating digital information received into multiple access signals, an amplifier for amplifying the multiple access signals and a power source for supplying power to the amplifier and the antenna.

5. The system of claim 4, wherein the at least one data device further comprises an analog-digital converter for accepting and sending analog signals.

6. The system of claim 5, wherein the at least one data device further comprises a sequence generator.

7. The system of claim 1, wherein the communication links between the packet data system and the main users are selected from a group consisting of microwave, satellite, wire or fiber optics.

8. The system of claim 1, wherein the data communication service is mobile and selected from a group consisting of a car cellphone, a computer or a stand-alone hand carried device.

9. The system of claim 1, wherein the data communication service is fixed and selected from a group consisting of a home, or a factory or a motel.

10. The system of claim 1, wherein the main users and the Internet provide the addressed data packets to the data communication service via the network hub modulator and the data device.

11. The system of claim 1, wherein the data communication service further comprises application devices supplying data to and receiving data from the data device via wireline, wireless or mixed interface means.

12. The system of claim 11, wherein the wide band connectionless data protocol transmits packetized digital data between the application devices and the data device.

13. The system of claim 1, wherein the network hub is selected from the group consisting of cellular, PCS or packet data network hubs.

14. A Home Data Service, for providing one or two-way connectionless data communication, comprising a data device at a home location, application devices at the home location connected to the data device for providing data to the data device, an antenna connected to the data device for transmitting and receiving addressed data packets using a wide band connectionless data protocol, a packet data network hub having an antenna for receiving the addressed data packet transmissions, and a data packet system connected by a communication link to the packet data network hub for directing the data packets to main users, wherein the data device has an address which is added to transmitted data packets and which is recognized by the data device when included in data packets broadcast from the network hub, and whereby recognition of the address prompts the data device to demodulate the broadcast data packets to digital information.

15. The system of claim 14, wherein the data device further comprises a modulator for converting application device information into Spread ALOHA Multiple Access (SAMA) data packets for transmission, and the network hub further comprises a modulator/demodulator for converting the SAMA data packets into addressed data packets for communicating to a packet data system for directing the addressed data packets to main user recipients.

16. A Personal Data Service comprising: at least a data device, an antenna connected to the data device for transmitting and receiving addressed data packets using a wide band connectionless data protocol and identical spreading codes, a packet data network hub having an antenna for receiving the addressed data packet transmissions, and a data packet system connected by a communication link to the packet data network hub, and a plurality of communication links between the data packets and main users for directing the data packets to main users, wherein the at least one data device has an address which is added to transmitted data packets and which is recognized by the data device when included in data packets broadcast from the network hub, and whereby recognition of the address prompts the data device to demodulate the broadcast data packets to digital information.

17. The system of claim 16, wherein the data devices are selected from a group consisting of stand-alone, hand-held cellular or PCS telephone, onboard cellular or PCS chips embedded in an automobile, card in a computer.

18. An overlay telecommunication system comprising at least one data device for transmitting and receiving data packets, a wide band connectionless data protocol communicating with the system, a network hub receiving the data packets from the at least one data device, a demodulator/modulator in the network hub for converting the data packets into addressed data packets, a data packet system communicating with the network hub for receiving and directing the addressed data packets to one or more desired destinations, wherein the at least one data device has an address for transmitting the data packets, the address being recognizable by the data device when included in the data packets transmitted from the network hub thereby prompting the data device to demodulate the broadcast data packets into digital information.

19. The system of claim 18, wherein the overlay telecommunication is an interactive home data service.

20. The system of claim 18, wherein the overlay telecommunication is an interactive personal data service.

21. The system of claim 18, wherein the overlay telecommunication is an interactive home and personal data service.

22. The system of claim 18, further comprising identical spreading codes for receiving and transmitting the data packets.

23. The system of claim 18, the network hub further comprising an antenna for receiving and sending transmissions.

24. The system of claim 18, wherein the data packets are multiplexed data packets.

25. The system of claim 18, wherein the destination includes one or more main users.

26. The system of claim 18, wherein the destination includes Internet.

27. The system of claim 18, wherein the at least one data device comprises a data communication transceiver and an antenna.

28. The system of claim 18, wherein the at least one data device further comprises a modulator/demodulator within the at least one data device for converting input information and transmitting into multiple access data packets.

29. An overlay telecommunication system comprising at least one data device for transmitting and receiving data packets, a wide band connectionless data protocol communicating with the system, a network hub receiving the data packets from the at least one data device, a demodulator/modulator in the network hub for converting the data packets into addressed data packets, a data packet system communicating with the network hub for receiving and directing the addressed data packets to one or more desired destinations, wherein the overlay telecommunication is an interactive home data service, wherein the at least one data device further comprises an input-output device for receiving and sending digital data, a signal processor for receiving signals from the input-output device and for packetizing and modulating the digital information in the form required for multiple access signals, an amplifier for amplifying the multiple access signals, and a power source for supplying power to the amplifier and the antenna.

30. The system of claim 27, wherein the data device further comprises an analog-digital converter for accepting and sending analog signals.

31. The system of claim 18, wherein the at least one data device further comprises a sequence generator.

32. The system of claim 18, further comprising communication links between the packet data system and the main users selected from a group consisting of microwave, satellite, wire and fiber optics, and communication links between the network hub and the packet data system selected from a group consisting of microwave, satellite and fiber optics.

33. The system of claim 18, wherein the telecommunication system is a mobile units selected from a group consisting of car phone, cellphone, computer and stand-alone hand carried device.

34. The system of claim 18, wherein the telecommunication system is fixed such as but not limited to a home, or a factory or a motel.

35. The system of claim 18, further comprising a network hub modulator for addressing the data packets to the telecommunication system via the network hub modulator and the at least one data device.

36. The system of claim 18, further comprising application devices for supplying data to and receiving data from the at least one data device via a communication means.

37. The system of claim 36, wherein the communication means is selected from a group consisting of wireline, wireless and mixed interface means.

38. The system of claim 36, further comprising application devices, wherein the wide band connectionless data protocol transmits packetized digital data between the application devices and the at least one data device.

39. The system of claim 38, wherein the application devices include home appliances.

40. The system of claim 18, wherein the network hub is selected from a group consisting of cellular, PCS and packet data network hubs.

41. The system of claim 18, wherein the network hub is mounted on a vertical structure.

42. The system of claim 1, wherein the communication link between the network hub and the packet data system is selected from a group consisting of microwave, satellite or fiber optic communication.

43. The system of claim 1, wherein the network hub is mounted on an existing or a purpose-built vertical structure.

* * * * *